April 29, 1969

L. C. SANFORD 3,440,935

SENSITOMETER

Filed June 27, 1966

LLOYD C. SANFORD
INVENTOR

BY *Robert L. Nathans*
*Homer O. Blair*

ATTORNEYS

LLOYD C. SANFORD
INVENTOR

United States Patent Office 3,440,935
Patented Apr. 29, 1969

3,440,935
SENSITOMETER
Lloyd C. Sanford, West Acton, Mass., assignor to Itek Corporation, Lexington, Mass., a corporation of Delaware
Filed June 27, 1966, Ser. No. 560,557
Int. Cl. G03b 27/72
U.S. Cl. 95—1    11 Claims

ABSTRACT OF THE DISCLOSURE

A portable sensitometer using dry cell storage batteries as a source of DC operating potential and an incandescent lamp as an illuminating means. The DC source voltage is stored across a capacitor having an avalanche or breakdown diode in shunt with the capacitor thereby assuring that the charge upon the capacitor is constant and not dependent upon fluctuations in the DC source. The handle of the sensitometer when contracted closes the exposure chamber and also actuates a switch closing a discharge path for the capacitor allowing the capacitor to discharge across the tungsten filament lamp.

---

Figure 1:
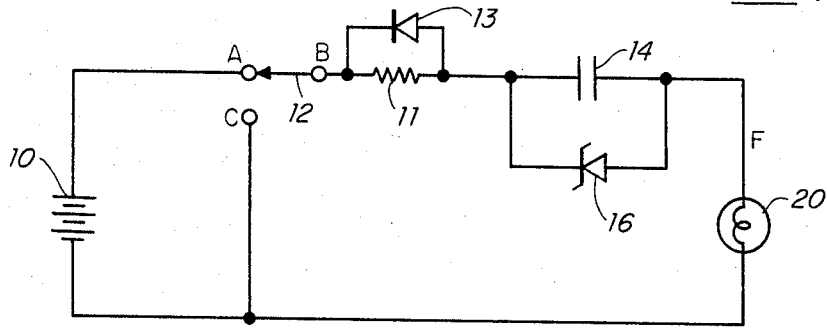

This invention relates to sensitometry. More precisely, the invention disclosed herein relates to apparatus useful for evaluating the response of photographic film to actinic energy which in turn is indicative of such properties as the photographic speed, density production, the contrast, processing characteristics, the color balance and the like of photographic film material.

Sensitometry is well known to those skilled in the photographic art and essentially involves the measurement and evaluation of the response of photographic materials to radiant energy. As presently practiced, sensitometry involves the determination of the density of photographic film materials exposed to a source of illumination of known intensity and spectral distribution for a known time, the development of the exposed film under precisely controlled and reproducible conditions, the correlation of the densities measured in the film to established standards for density, and the interpretation of the results.

The present invention relates to a novel sensitometer having a combination of structural elements which cooperate in an integrated fashion to permit the exposure of a photosensitive material to a source of illumination of known intensity variation and spectral distribution for a known time to produce a predetermined total flux. Sensitometers heretofore used in the field consist of a light source and a means of varying the exposure given to the film by varying either the intensity and/or the time of that exposure. Light sources for sensitometric exposures must be selected with consideration to both their suitability for the sensitive material as well as their suitability in intensity and spectral distribution. Moreover, precautions must be taken so that the total illumination by the light source incident upon the film is maintained constant together with the spectral distribution so that valid interpretations may be made.

In some instances heretofore, sensitometers have employed incandescent sources such as tungsten-filament lamps. Generally in such sensitometers, the light has passed from the incandescent source to the film through a calibrated shutter for controlling the exposure interval. However, an outstanding problem in such sensitometers is that it is extremely difficult to control both the intensity of light obtained from incandescent sources as well as the spectral distribution thereof. For example, transient variations in voltage produce very great changes not only in the quantity or intensity of the incandescent light but also in the color or spectral distribution thereof. Accordingly, sensitometric determinations made from such sensitometers are usually unreliable unless precautions are taken to assure that the intensity and the spectral distribution of the illumination of the source can be accurately reproduced from time to time.

In order to avoid the disadvantages implicit in the use of incandescent sources, various sensitometers have been proposed which utilize flash lamps. Such sensitometers in general, employ gas discharge tubes as the illumination sources. An example of such a sensitometer is found in U.S. Patent No. 3,001,459.

Those well skilled in the art will readily admit that the present sensitometers, whether they employ incandescent sources or flash lamps, are all rather intricate, cumbersome, and expensive requiring complicated equipment, controls and adjustments. In contrast thereto, the preferred apparatus embodying the present invention is a simple, relatively inexpensive sensitometer which employs a tungsten flash lamp as a source of illumination and the intensity and spectral distribution of the source of illumination can be reliably reproduced with a remarkable degree of consistency.

The principal object of the present invention is to provide an improved sensitometer.

Another object of the present invention is to provide a sensitometer which is simple, compact, and easily transportable from place to place.

Still another object of the present invention is to provide a sensitometer which can reliably and repeatably produce a light flash having constant total illumination and spectral distribution.

Yet another object of the present invention is to provide a simple sensitometer whose output flux is constant regardless of output voltage variations of the energizing source.

Other objects and advantages of the present invention will in part be obvious or will in part appear hereinafter.

In accordance with the present invention, a storage device is charged by a fixed predetermined amount regardless of fluctuations in the output voltage of a charging voltage source and is discharged through a source of illumination which exposes a photosensitive medium. Since the amount of power passed through the illumination source is constant during each discharge interval the total illumination flux will be constant for each exposure.

Figure 3:
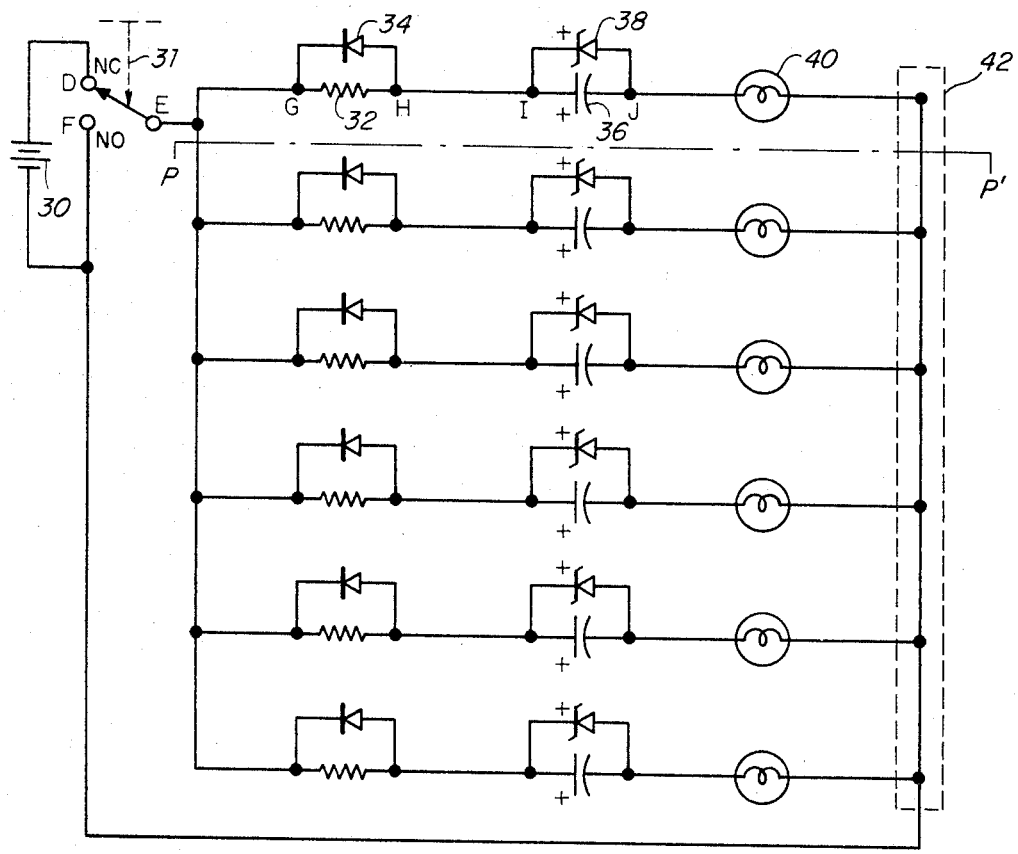
Figure 2:
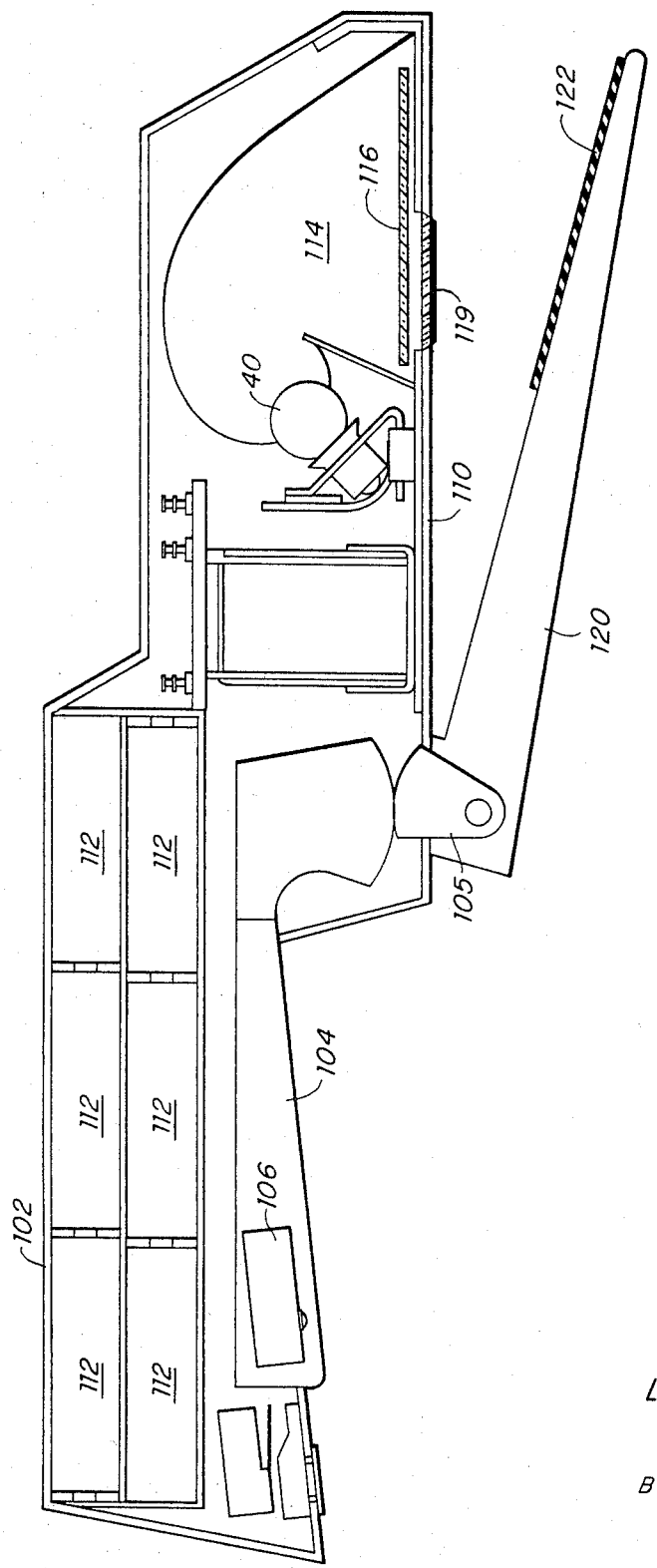

My invention will be better understood with reference to the attached drawings of which FIGURE 1 is a simplified diagram of the essential elements of the circuitry employed in my sensitometer produced in accordance with the present invention and FIGURE 3 is a schematic of the circuitry employed in the sensitometer of FIGURE 2.

Referring now to FIGURE 1, there is shown a charging circuit which comprises DC source 10 connected to condenser 14 through a two position switch 12 shown in position A–B, and resistor 11 shunted by diode 13. Connected to condenser 14 is a voltage regulator 16. Voltage regulator 16 breaks down and operates after condenser 14 has been charged to a predetermined voltage to maintain the voltage across the condenser at this level and hence to provide the maintenance of a fixed predetermined charge in the condenser. In the preferred practice of the present invention, voltage regulator 16 is actuated when condenser 14 is charged to about 75 percent of the voltage potential of source 10. During charging, diode 13 is back biased so that resistor 11 causes current flowing through lamp 20 to be maintained at a low value which is insufficient to illuminate the lamp to adversely affect the photosensitive media coacting therewith. After charging condenser 14 to the predetermined voltage, tungsten flash source 20 is illuminated by throwing switch 12 to position B–C.

Diode 13 is now forward biased to effectively shunt resistor 11 to sharply reduce the time constant of the discharge loop which provides a sufficiently high current flow through lamp 20 to produce a flash. Since the voltage across condenser 14 is fixed and predetermined, the total flux or illumination will be fixed during each discharge interval.

The advantages implicit in the use of the circuitry which I have found to be especially advantageous in sensitometers will become more apparent with reference to FIGURES 2 and 3.

Referring first to FIGURE 3, there is shown DC source 30. Although six incandescent lamps which are flashed are shown in FIGURE 3, nevertheless, only that portion of the circuit above line P–P' need be discussed in detail hereinafter. DC source 30 is connected to resistor 32 by means of two position, momentary contact switch 31 shown in position DE. In the circuitry of FIGURE 3, resistor 32 is selected so that the resistance thereof is sufficient to prevent the passage of current therethrough which could illuminate flash lamp 40. Connected in parallel with resistor 32 is a diode 34, preferably a solid state diode, having a high resistance to current in the direction of G–H and a low resistance to current in the direction of H–G. Resistor 32 is connected to condenser 36. Condenser 36 is selected so that said consender can be charged to a voltage such that when discharged, sufficient power is released to illuminate flash lamp 40. Connected in parallel with condenser 36 is a Zener diode 38 which has an avalanche breakdown voltage less than that of the voltage potential of source 30. For example, in the embodiment of the present invention shown in FIGURES 2 and 3, the avalanche breakdown voltage of the Zener diode 38 is 10 volts. Accordingly, it can be seen that when condenser 36 is charged to 10 volts, Zener diode 38 is actuated to produce constant total illumination as explained hereinabove.

Accordingly, it will be apparent that at any time after Zener diode 38 has been actuated, the predetermined fixed charge stored in condenser 36 can be rapidly discharged through forward biased diode 34 to illuminate tungsten flash lamps 40 by changing the position of switch 31 from position ED to EF. Accordingly, the circuitry of FIGURE 3 provides an arrangement of elements especially advantageous in the practice of sensitometry since in accordance therewith, the total illumination and spectral distribution of the illumination emitted by a tungsten flash source can be consistently reproduced over long periods of time in a relatively simple but highly reliable fashion.

FIGURE 2 illustrates a cross-sectional view of a portable sensitometer employing the circuitry of FIGURE 3 and which can be operated while held in the hand. As shown in FIGURE 2, voltage source 112 comprises a plurality of batteries shown stored in a chamber which is an integral part of handle 102. Associated with handle 102 is trigger 104 which contains firing switch 106. Gear 105 is operationally connected with trigger 104 so that upon compression of trigger 104, lower jaw 120 is forced securely against the lower surface 110 of the sensitometer. A resilient material such as a rubber pressure pad 122 is attached to that portion of lower jaw 120 which covers density wedge 119. In such a fashion, a light-tight seal is provided for chamber 114 upon closing lower jaw 120. Chamber 114 essentially functions as a reflector for light emitted from flash sources 40. In the embodiment of my invention disclosed in FIGURE 2, I prefer to provide the inner portion of light-tight chamber 114 with a diffusing surface so as to integrate the light output produced by the bulbs to produce uniform exposure of the photosensitive media. It is to be understood that other means for transmitting light from flash sources 40 to density wedge 119 can also be suitably employed in the practice of the present invention. For example, a light pipe or optical fiber bundle can be suitably employed to transmit light from flash lamps 40 to density wedge 119. As shown in FIGURE 2, a density filter 116 is provided within chamber 114. If desired, means can be combined with said density filter to interchange the filter covering density wedge 119. For example, density filter 116 can comprise 2 or more filters of differing densities and said filters can be interchanged by moving density filter 116 so that the filter of the desired density covers density wedge 119.

In the use of a sensitometer of the type disclosed in FIGURE 3, the film to be exposed is placed on rubber pressure pad 122 with the radiation sensitive coating thereof facing chamber 114. Trigger 104 is then compressed and lower jaw 120 is forced securely against the lower surface 110 of the sensitometer, thereby assuring a light-tight seal as well as pressing the radiation sensitive material in intimate contact with the density wedge. Firing switch is thereby automatically actuated and tungsten flash lamps 40 are illuminated. Thereafter, the pressure on trigger 104 is released, opening lower jaw 120 and the exposed film is conveniently removed therefrom. A sensitometer of the type described in FIGURES 2 and 3 can expose photographic film to a source of illumination which is constant in total illumination and spectral distribution at the rate of about one exposure per second.

In the embodiment described in FIGURES 2 and 3 built by the inventor's assignee the component types and values were as follows:

| | |
|---|---|
| Resistor 32 _____ohms__ | 51 |
| Diode 34 (silicon rectifier) _____ | 1N2071 |
| Condenser 36 _____mfd__ | 2000 |
| Diode 38 _____ | 1N960B |
| Lamp 40 _____ | #233 |
| Battery 30 _____volts__ | 12.5 |

It will be readily apparent from the discussion above that the practice of the present invention enables one to produce a compact, lightweight, battery operated sensitometer which is capable of repeatedly exposing photographic films through a density wedge to a short duration flash illumination having constant total illumination and spectral distribution. Such a portable sensitometer offers many advantages over sensitometers presently used in the art. For example, such sensitometers can be conveniently employed as a quality control tool in applications where the sensitometer must be brought to the film to expose density wedges thereon such as on continuously moving film.

Various modifications of incidental details offered above for the purpose of illustrating my invention may be utilized in the practice of my invention without departing from the spirit and scope thereof.

Having defined my invention together with preferred embodiments thereof as well as manners of practicing same, what I declare as new and desire to secure by U.S. Letters Patent is as follows:

1. A sensitometer comprising:
 (a) a source of illumination;
 (b) a photosensitive medium positioned in optical relationship to said source of illumination;
 (c) an energy storage device;
 (d) a voltage source having a given output voltage;
 (e) a first circuit having a given time constant, including said voltage source and said storage device for charging said storage device to a predetermined voltage less than the given output voltage of said voltage source and further including a voltage regulation device coupled in shunt relationship with said storage device;
 (f) a second circuit having a time constant substantially less than the time constant of said first circuit and including said storage device and said source of illumination for causing the energy stored in said storage device to be discharged into said source of illumination at a rate to cause illumination of said source of illumination.

2. The sensitometer of claim 1 wherein said voltage regulator device is a Zener diode connected in parallel with said storage device.

3. A sensitometer for exposing a photosensitive medium to subsequently determine the photographic properties thereof by density measurements, said sensitometer comprising in combination:
   (a) an exposure chamber which includes a source of illumination in optical relationship with said medium;
   (b) a direct current circuit having a voltage source of a given potential;
   (c) a storage device;
   (d) means for coupling said voltage source, said storage device and said source of illumination in series for inserting a predetermined amount of energy into said storage device;
   (e) a Zener diode having an avalanche breakdown voltage corresponding to a predetermined potential which potential is inserted into said storage device, coupled to said storage device to maintain said predetermined amount of energy in said storage device and a corresponding predetermined potential across said device less than said given potential; and
   (f) means for decoupling said voltage source from said storage device and for discharging said predetermined energy stored in said device into said source of illumination at a rate high enough to illuminate said source of illumination.

4. The sensitometer of claim 3 wherein said exposure chamber has an exposure aperture therein and includes a member arranged in combination with said chamber to cover said aperture when said member is pressed against said aperture and means to press said member against said aperture and wherein said means to press said member against said aperture also operates to move a switch from a first position in which said voltage source is coupled to said storage device to charge said storage device to a second position in which said storage device is coupled across said source of illumination.

5. A portable sensitometer comprising:
   (a) a casing, a portion of which defines an exposure chamber having an exposure aperture therein;
   (b) a source of illumination in said chamber;
   (c) means in said chamber to integrate the output of said source to provide uniform exposure through said aperture;
   (d) a handle coupled to said casing and being able to accommodate a battery;
   (e) a hinged member arranged in combination with said casing to cover said aperture when said member is pressed against said aperture;
   (f) means to press said member against said aperture;
   (g) a direct current circuit comprising:
      (1) said battery,
      (2) a resistor,
      (3) a condenser,
      (4) a source of illumination,
      (5) means to couple said battery, resistor, condenser and source of illumination in series,
      (6) means coupled in shunt with said resistor to provide a high impedance to current flowing from said battery into said condenser and to provide a low impedance to current flowing in the opposite direction,
      (7) a breakdown device coupled in shunt relationship with said condenser to prevent the voltage across said condenser from exceeding a predetermined voltage less than the given output voltage of said battery, and
      (8) a switch for coupling said voltage source in series with said condenser in one position to charge said condenser and for decoupling said voltage source from said condenser and for coupling said condenser across said source of illumination in the other position in response to the actuation of said means to press said member against said aperture.

6. A portable sensitometer operating on conventional dry storage batteries as a source of energy for precisely exposing photographic materials to radiant energy, comprising:
   an incandescent lamp normally connected across said energy source;
   circuit means connected between said source and said lamp having
      a voltage storage device and a voltage regulator in shunt with said storage device;
   further circuit means for providing a rapid discharge path for said storage device, said path including said lamp.

7. The device of claim 6 wherein said incandescent lamp is a tungsten filament lamp.

8. The device of claim 6 wherein said circuit means further includes a limiting resistor in series with said storage device.

9. The device of claim 8 wherein said further circuit means includes means connected in parallel with said limiting resistor means, providing a high impedance to current flowing said said source to said storage device and low impedance to current flowing in the opposite direction.

10. The device of claim 9 wherein said means connected in parallel with said limiting means is a diode.

11. The device of claim 9 wherein said voltage regulator is a Zener diode.

References Cited

UNITED STATES PATENTS 3,001,459  9/1961  Wyckoff.
3,122,651  2/1964  Hawkins _____ 307—318

NORTON ANSHER, *Primary Examiner.*

L. H. McCORMICK, Jr., *Assistant Examiner.*

U.S. Cl. X.R.

250—219; 307—246, 318; 315—227